United States Patent
Tsukamoto

(10) Patent No.: US 7,620,618 B2
(45) Date of Patent: Nov. 17, 2009

(54) INFORMATION PROCESSING APPARATUS HAVING A VIRTUAL FILE FOLDER STRUCTURE CONVERTER AND METHOD THEREFOR

(75) Inventor: Nobuyuki Tsukamoto, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 426 days.

(21) Appl. No.: 11/261,003

(22) Filed: Oct. 28, 2005

(65) Prior Publication Data

US 2006/0095463 A1 May 4, 2006

(30) Foreign Application Priority Data

Nov. 2, 2004 (JP) .............................. 2004-319524

(51) Int. Cl.
*G06F 7/00* (2006.01)
(52) U.S. Cl. ............................... 707/2; 707/1; 707/100; 707/104.1; 707/200
(58) Field of Classification Search .................. 711/221
See application file for complete search history.

(56) References Cited

U.S. PATENT DOCUMENTS

| | | | | |
|---|---|---|---|---|
| 5,113,512 A * | 5/1992 | Miki et al. | ................... | 711/206 |
| 5,361,349 A * | 11/1994 | Sugita et al. | .................... | 707/8 |
| 6,356,915 B1 * | 3/2002 | Chtchetkine et al. | ........ | 707/200 |
| 6,417,913 B2 | 7/2002 | Tanaka | | |
| 6,477,616 B1 * | 11/2002 | Takahashi | ................... | 711/111 |
| 6,795,824 B1 * | 9/2004 | Bradley | ....................... | 707/10 |
| 2001/0009456 A1 | 7/2001 | Tanaka | | |
| 2002/0060740 A1 * | 5/2002 | Kato | ........................... | 348/232 |
| 2002/0080252 A1 * | 6/2002 | Nagaoka et al. | ............. | 348/232 |
| 2003/0142953 A1 * | 7/2003 | Terada et al. | ................... | 386/46 |
| 2003/0182279 A1 | 9/2003 | Willows | | |
| 2004/0047597 A1 * | 3/2004 | Hirabayashi et al. | .......... | 386/69 |

FOREIGN PATENT DOCUMENTS

| | | |
|---|---|---|
| JP | 2001-197408 A | 7/2001 |
| JP | 2002-278996 A | 9/2002 |
| JP | 2003-050811 A | 2/2003 |

OTHER PUBLICATIONS

"Logical Block Addressing from FOLDOC," Foldoc.org, Apr. 30, 2000, http://www.foldoc.org/index.cgi?query=logical+block+addressing.*
Quirke, Chris. "Understanding FAT," iafrica.com, Nov. 2002, http://users.iafrica.com/c/cq/cquirke/fat.htm.*

* cited by examiner

*Primary Examiner*—Hung Q Pham
(74) *Attorney, Agent, or Firm*—Rossi, Kimms & McDowell LLP

(57) ABSTRACT

A reproducing apparatus comprises: a read unit for reading an information data file storing information data and an index file relating to the information data file, from a recording medium; a communication unit for transmitting the data file read by the read unit to an external apparatus for processing the data file in accordance with a predetermined file system; a conversion unit for converting the index file into a structure corresponding to the predetermined file system and generating conversion index information; and a control unit for controlling the communication unit to transmit the conversion index information in response to a data transmission request from the external apparatus.

4 Claims, 10 Drawing Sheets

FIG. 3

| START BYTE POSITION | DATA LENGTH | FIELD NAME |
|---|---|---|
| 0 | L_PR1 | PROPERTY ENTRY #1 |
| L_PR1 | L_PR2 | PROPERTY ENTRY #2 |
| L_PR1+L_PR2 | L_PR3 | PROPERTY ENTRY #3 |
| ... | ... | ... |
| L_PR1+...+L_PRn−1 | L_PRn | PROPERTY ENTRY #n |

FIG. 4

| START BYTE POSITION | DATA LENGTH | FIELD NAME |
|---|---|---|
| 0 | 1 | TYPE |
| 1 | 1 | PROPERTY DATA LENGTH |
| 2 | 2 | PROPERTY ENTRY NUMBER |
| 4 | 2 | TITLE ENTRY NUMBER |
| 6 | 2 | PARENT ENTRY NUMBER |
| 8 | VARIABLE LENGTH | FILE IDENTIFIER |

FIG. 5

| START BYTE POSITION | DATA LENGTH | FIELD NAME |
|---|---|---|
| 0 | L_TL1 | TITLE ENTRY #1 |
| L_TL1 | L_TL2 | TITLE ENTRY #2 |
| L_TL1+L_TL2 | L_TL3 | TITLE ENTRY #3 |
| ... | ... | ... |
| L_TL1+···+L_TLn−1 | L_TLn | TITLE ENTRY #n |

FIG. 7

| ENTRY NUMBER | 1 | 2 | 3 | 4 | 5 | 6 | 7 | 8 | 9 |
|---|---|---|---|---|---|---|---|---|---|
| TYPE | ROOT | FOLDER | FILE | FOLDER | FOLDER | FILE | FILE | FOLDER | FILE |
| TITLE ENTRY | – | 1 | 2 | 3 | 4 | 5 | 6 | 7 | 8 |
| PARENT ENTRY | 0 | 1 | 2 | 1 | 4 | 5 | 6 | 4 | 8 |
| FILE IDENTIFIER | – | – | "ABCD0004.mpg" | – | – | "ABCD0003.mpg" | "ABCD0002.mpg" | – | "ABCD0001.mpg" |

FIG. 8

| ENTRY NUMBER | 1 | 2 | 3 | 4 | 5 | 6 | 7 | 8 |
|---|---|---|---|---|---|---|---|---|
| CHARACTER TRAIN | "CHILD" | "FIELD DAY" | "TRAVEL" | "ISLAND" | "SANDY BEACH" | "SURFING" | "TOWN" | "BUS STOP" |

FIG. 9

| LSN | DESCRIPTOR | STRUCTURE | LBN |
|---|---|---|---|
| 0 TO 15 | RESERVE (00h) | | |
| 16 | EXPANSION AREA HEAD DESCRIPTOR | "BEA01" | |
| 17 | NSR DESCRIPTOR | "NSR02" | |
| 18 | EXPANSION AREA TERMINAL DESCRIPTOR | "TEA01" | |
| 19 TO 31 | RESERVE (00h) | | |
| 32 | BASIC VOLUME DESCRIPTOR | MAIN VOLUME DESCRIPTOR TRAIN | UNALLOCATED |
| 33 | PROCESSING SYSTEM VOLUME DESCRIPTOR | | |
| 34 | PARTITION DESCRIPTOR (PARTITION HEAD LSN=272) | | |
| 35 | LOGICAL VOLUME DESCRIPTOR (FILE SET DESCRIPTOR TRAIN HEAD LBN=80) | | |
| 36 | UNALLOCATED SPATIAL DESCRIPTOR | | |
| 37 | TERMINAL DESCRIPTOR | | |
| 38 TO 47 | CONSECUTIVE LOGICAL SECTOR (00h) | | |
| 48 | LOGICAL VOLUME MAINTENANCE DESCRIPTOR | LOGICAL VOLUME MAINTENANCE TRAIN | |
| 49 | TERMINAL DESCRIPTOR | | |
| 50 TO 63 | CONSECUTIVE LOGICAL SECTOR (00h) | | |
| 64 TO 255 | RESERVE (00h) | | |
| 256 | START VOLUME DESCRIPTOR POINTER (FILE ENTRY OF ROOT DIRECTRY LBN=82) | | |
| 257 TO 271 | RESERVE (00h) | | |
| 272 TO 351 | SPATIAL BIT MAP DESCRIPTOR | | 0 TO 79 |
| 352 | FILE SET DESCRIPTOR (FILE ENTRY OF ROOT DIRECTORY LBN=82) | | 80 |
| 353 | TERMINAL DESCRIPTOR | | 81 |
| 354 | FILE ENTRY (LOOT DIRECTORY LBN=83) | | 82 |
| ... | | | ... |
| | FILE ENTRY (ABCD0001.mpg) | | 100 |
| | ACTUAL DATA OF ABCD0001.mpg | | 101 TO 150 |
| | FILE ENTRY (ABCD0002.mpg) | | 151 |
| | ACTUAL DATA OF ABCD0002.mpg | | 152 TO 300 |
| | FILE ENTRY (ABCD0003.mpg) | | 301 |
| | ACTUAL DATA OF ABCD0003.mpg | | 302 TO 600 |
| | FILE ENTRY (ABCD0004.mpg) | | 601 |
| | ACTUAL DATA OF ABCD0004.mpg | | 602 TO 900 |
| | UNALLOCATED | | 901 TO LAST LBN |

FIG. 10

| VLBN | DESCRIPTOR | STRUCTURE |
|---|---|---|
| 82 | FILE ENTRY (ROOT DIRECTORY VLBN=901) | FILE ENTRY OF ROOT DIRECTORY |
| 901 | FILE IDENTIFIER DESCRIPTOR (PARENT DIRECTOR "ROOT" FILE ENTRY VLBN=82) | ROOT DIRECTORY |
| 901 | FILE IDENTIFIER DESCRIPTOR (DIRECTORY "CHILD" FILE ENTRY VLBN=902) | ROOT DIRECTORY |
| 901 | FILE IDENTIFIER DESCRIPTOR (DIRECTORY "TRAVEL" FILE ENTRY VLBN=904) | ROOT DIRECTORY |
| 902 | FILE ENTRY ("CHILD" DIRECTORY VLBN=903) | FILE ENTRY OF DIRECTORY "CHILD" |
| 903 | FILE IDENTIFIER DESCRIPTOR (PARENT DIRECTOR "ROOT" FILE ENTRY VLBN=82) | DIRECTORY "CHILD" |
| 903 | FILE IDENTIFIER DESCRIPTOR (FILE "FIELD DAY.mpg" FILE ENTRY VLBN=601) | DIRECTORY "CHILD" |
| 904 | FILE ENTRY ("TRAVEL" DIRECTORY VLBN=905) | FILE ENTRY OF DIRECTORY "TRAVEL" |
| 905 | FILE IDENTIFIER DESCRIPTOR (PARENT DIRECTOR "ROOT" FILE ENTRY VLBN=82) | DIRECTORY "TRAVEL" |
| 905 | FILE IDENTIFIER DESCRIPTOR (DIRECTORY "ISLAND" FILE ENTRY VLBN=906) | DIRECTORY "TRAVEL" |
| 905 | FILE IDENTIFIER DESCRIPTOR (DIRECTORY "TOWN" FILE ENTRY VLBN=908) | DIRECTORY "TRAVEL" |
| 906 | FILE ENTRY ("ISLAND" DIRECTORY VLBN=907) | FILE ENTRY OF DIRECTORY "ISLAND" |
| 907 | FILE IDENTIFIER DESCRIPTOR (PARENT DIRECTOR "TRAVEL" FILE ENTRY VLBN=904) | DIRECTORY "ISLAND" |
| 907 | FILE IDENTIFIER DESCRIPTOR (FILE "SANDY BEACH.mpg" FILE ENTRY VLBN=301) | DIRECTORY "ISLAND" |
| 907 | FILE IDENTIFIER DESCRIPTOR (FILE "SURFING.mpg" FILE ENTRY VLBN=151) | DIRECTORY "ISLAND" |
| 908 | FILE ENTRY ("TOWN" DIRECTORY VLBN=909) | FILE ENTRY OF DIRECTORY "TOWN" |
| 909 | FILE IDENTIFIER DESCRIPTOR (PARENT DIRECTOR "TRAVEL" FILE ENTRY VLBN=904) | DIRECTORY "TOWN" |
| 909 | FILE IDENTIFIER DESCRIPTOR (FILE "BUS STOP.mpg" FILE ENTRY VLBN=100) | DIRECTORY "TOWN" |

INFORMATION PROCESSING APPARATUS HAVING A VIRTUAL FILE FOLDER STRUCTURE CONVERTER AND METHOD THEREFOR

BACKGROUND OF THE INVENTION

1. Field of the Invention

The present invention relates to an information processing apparatus, and more particularly to an apparatus for processing information data files by using index files.

2. Related Background Art

There are conventional apparatuses which manage data such as video data and audio data in the form of files.

Among these apparatuses, there is an apparatus which manages a plurality of information data files by using index files storing index information for identifying the contents of each data file stored on a recording medium (e.g., refer to Japanese Patent Application Laid-Open No. 2002-278996, corresponding U.S. Publication No. 2003182279). In the apparatus described in Japanese Patent Application Laid-Open No. 2002-278996, a layout of information data files recorded on a recording medium is displayed on a display by using index files. A user designates a desired file by referring to the displayed index files and instructs to reproduce the desired file.

For example, an index film may be a file (title file) storing collection of character trains each added to an information file to feature the contents thereof.

The apparatus described in Japanese Patent Application Laid-Open No. 2002-278996 can manage a plurality of information data files stored on a recording medium by classifying them into common elements (virtual folders) such as record dates, travel locations and events.

It is considered to make part of property information in an index file have information defining attribute information (flag) (e.g., refer to Japanese Patent Application Laid-Open No. 2003-50811, corresponding U.S. Publication No. 2004047597). In this case, it is possible to retrieve and sort files on a recording medium at high speed and to judge at high speed whether a file is to be erased.

The above-described structures of prior art are, however, associated with the following problems.

For example, there is a case that video data or the like recorded on a recording medium is transferred to an external apparatus such as a personal computer to edit and view it.

In this case, even if video data is transferred to the external apparatus, information such as a virtual holder structure and titles cannot be confirmed on the external apparatus, because property information, title information and the like of an index file are lacking.

There arises therefore a problem that a user feels difficulty in processing data transferred from the recording apparatus to the external apparatus.

It can therefore be considered that data as well as the index file is transferred to the external apparatus.

However, also in this case, if the external apparatus does not have a dedicated application for understanding the structure of the index file, information such as the virtual holder structure and titles cannot be confirmed on the external apparatus.

There arises therefore a problem that a user feels difficulty in processing data transferred from the recording apparatus on the external apparatus.

SUMMARY OF THE INVENTION

It is an object of the present invention to solve the above-described problems.

Another object of the present invention is to allow an external apparatus to easily process an externally received data file even if the external apparatus does not have a dedicated application for understanding the structure of an index file.

In order to solve the above-described problems and achieve the above-described objects, the present invention provides a reproducing apparatus comprising: read means for reading an information data file storing information data and an index file relating to the information data file, from a recording medium; communication means for transmitting the information data file read by the read means to an external apparatus for processing the information data file in accordance with a predetermined file system; conversion means for converting the index file into a structure corresponding to the predetermined file system and generating conversion index information; and control means for controlling the communication means to transmit the conversion index information in response to a data transmission request from the external apparatus.

Other objects and advantages of the present invention will become apparent from the following detailed description taken in conjunction with the accompanying drawings.

BRIEF DESCRIPTION OF THE DRAWINGS

FIG. 3 is a diagram showing an example of a property file.

FIG. 4 is a diagram showing an example of real data of a property entry.

FIG. 5 is a diagram showing an example of a title file.

FIG. 7 is a diagram showing an example of information on property entries according to an embodiment.

FIG. 8 is a diagram showing an example of information on title entries according to an embodiment.

FIG. 9 is a diagram showing an example of a volume structure and a file structure in a disk.

FIG. 10 is a diagram showing an example of virtual directory information.

DESCRIPTION OF THE PREFERRED EMBODIMENTS

Embodiments of the present invention will be described with reference to the accompanying drawings.

Figure 1:
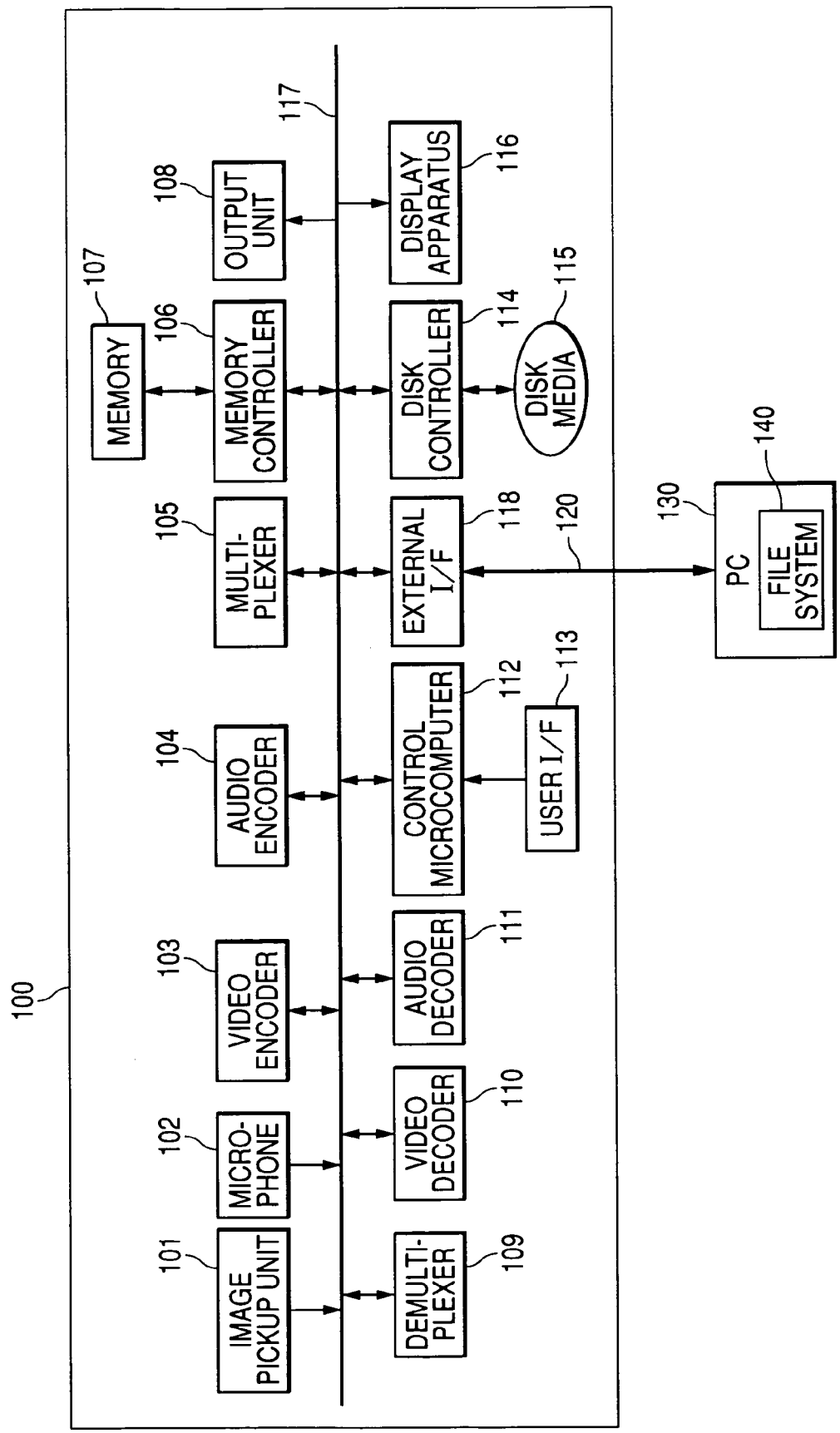
FIG. 1 is a block diagram showing an example of the structure of a video camera and a personal computer PC according to an embodiment of the present invention.

FIG. 1 is a block diagram showing an example of the structure of a system connecting a video camera 100 and a PC 130 according to an embodiment of the present invention.

First, description will be made on a photographing operation by the video camera 100.

When power is supplied by using a user interface (I/F) 113 including a power switch, a record switch and the like, a control microcomputer 112 controls each component of the video camera, and an image photographed by an image pickup unit 101 is displayed on a display 116.

In this state, upon instruction of a record start, the control microcomputer 112 controls a video encoder 103 to encode moving image data output from the image pickup unit 101 to compress its information amount. The control microcomputer 112 also controls an audio encoder 104 to encode audio data output from a microphone 102 to compress its information amount.

In this embodiment, the video encoder 103 and audio encoder 104 encode moving image data and audio data in accordance with an MPEG scheme. Each output from the video encoder 103 and audio encoder 104 is called an elementary stream.

MPEG elementary streams output from the video encoder 103 and audio encoder 104 are added with necessary data such as sync data and then multiplexed by a multiplexer 105. A stream multiplexed by the multiplexer 105 is temporarily stored in a memory 107 via a memory controller 106, as MPEG2-PS (program stream).

When the memory controller 106 is requested by the control microcomputer 112 to write data on a disk media 115, it reads MPEG2-PS data from the memory 107. The control microcomputer 112 stores various data generated during execution of programs into the memory 107 via the memory controller 106.

The disk controller 114 writes the MPEG2-PS data read from the memory 107 onto the disk media 115. In this embodiment, a set of MPEG2-PS data generated during a period from record start instruction to record stop instruction is recorded on the disk media 115 as one MPEG file. In this embodiment, an optical disk such as a DVD-RAM is used as the disk media.

The disk controller 114 controls read/write of various data and files as to the disk media 115 and controls the format thereof. In managing files on a recording media such as the disk media 115, generally a file system such as FAT (File Allocation Table) and UDF (Universal Disk Format) is used.

For example, UDF is defined so as to establish compatibility of information data files between various computer OSes. UDF has been adopted as a file system of DVD-Video and rewritable disks such as DVD-RAM, and is expected to be adopted further by a variety of platforms.

In this embodiment, UDF is used as the file system for managing files on the disk media 115. UDF is defined on the basis of ISO/IEC 13346 (Volume and file structure of write-once and rewritable media using non-sequential recording for information interchange).

Next, description will be made on a reproduction operation by the video camera 100.

Upon reproduction instruction from the user I/F 113 after the MPEG file recorded on the disk media 115 is designated, the control microcomputer 112 instructs the disk controller 114 to read the designated MPEG film from the disk media 115. In accordance with the instruction from the control microcomputer 112, the disk controller 114 reads the designated MPEG file from the disk media 115, and extracts MPEG2-PS data and outputs it to the memory controller 106.

The MPEG2-PS data output from the disk media 115 is stored in the memory 107 via the memory controller 106. In response to a request from the control microcomputer 112, the MPEG2-PS data stored in the memory 107 is output to a demultiplexer 109 via the memory controller 106.

In order to continuously reproduce moving image data and audio data, the control microcomputer 112 controls the memory controller 106 and disk controller 114 in such a manner that the memory 107 does not overflows or underflows, by monitoring the amount of MPEG2-PS data read from the disk media 115 and stored in the memory 107 and the amount of data read from the memory 107 and supplied to the demultiplexer 109.

In this manner, the control microcomputer 112 intermittently reads data from the disk media 115. Under the control of the control microcomputer 112, the demultiplexer 109 demultiplexes the MPEG2-PS data into a video elementary stream and an audio elementary stream.

The video elementary stream is supplied to a video decoder 110. The video decoder 110 decodes the reproduced video elementary stream and outputs it to the display 116 and an output unit 108. The display 116 displays the reproduced moving image data.

The reproduced audio elementary stream is supplied to an audio decoder 111. The audio decoder 111 decodes the reproduced audio elementary stream and outputs it to the output unit 108. The output unit 108 converts the reproduced moving image data and audio data into the form suitable for outputting the data to an external TV monitor or the like, and outputs the converted data.

Next, description will be made on processes to be executed after the video camera 100 and personal computer (PC) 130 of the embodiment are connected via a transmission line (interface cable) 120.

An external I/F 118 of the video camera 100 is used for connecting an external apparatus such as PC 130 to the video camera 100. In this embodiment, although interfaces such as USB, IEEE1394, wireless LAN and the like are used, other interfaces may also be used.

PC 130 processes various information data files recorded in a built-in HDD or the like, by using a file system 140. In this embodiment, the file system uses UDF similarly to the file system of the disk media 115.

The file system 140 of PC 130 requests a particular sector of the disk media 115 from the control microcomputer 112 via the transmission line 120 and external I/F 180. It is therefore possible to recognize the volume structure and file structure of the disk media 115.

With reference to FIGS. 2 to 8, detailed description will be made on how the file system manages an MPEG file photographed with the video camera 100.

Figure 2:
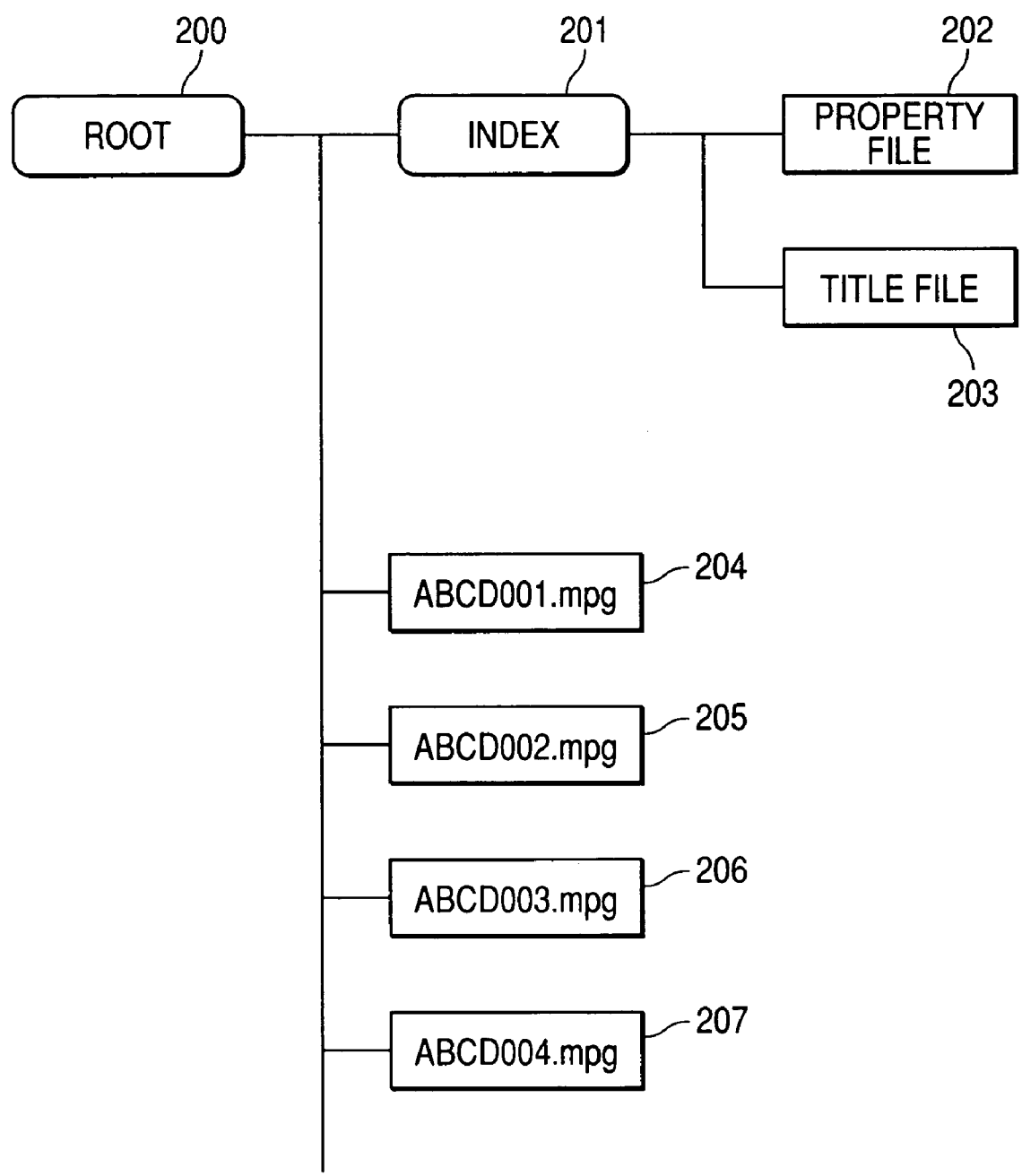
FIG. 2 is a diagram showing an example of directories of a file system.

FIG. 2 is a diagram showing an example of the structure of the MPEG file photographed with the video camera 100.

Four MPEG files are stored under a Root directory 200, the MPEG files including "ABCD0001.mpg" 204, "ABCD002.mpg" 205, 4, "ABCD003.mpg" 206 and "ABCD004.mpg" 207 in the order of photographing.

A property file 202 and a title file 203 which are index files are stored under an Index directory 201.

The property file 202 is a set of property entries indicating attributes of MPEG files. The title file 203 is a set of title entries indicating title attributes of MPEG files.

FIG. 3 is a diagram showing an example of the property file 202.

Referring to FIG. 3, the property file 202 is a table showing data lengths $L\_PR1, L\_PR2, L\_PR3, \ldots, L\_PRn$ and start byte positions $0, L\_PR1, L\_PR1+L\_PR2, \ldots, L\_PR1+L\_PR2+ \ldots +L\_PRn-1$, respectively of a property entry #1, a property entry #2, a property entry #3, ..., a property entry #n indicating the attributes of the MPEG files 204 to 207. A data length is represented, for example, by a byte unit.

Similarly, FIG. 5 is a diagram showing an example of the title file 203.

Referring to FIG. 5, the title file 203 is a table showing data lengths $L\_TL1, L\_TL2, L\_TL3, \ldots, L\_TLn$ and start byte positions 0, L_TL1, L_TL1+L_TL2, ..., L_TL1+L_TL2+ ... +L_TLn−1, respectively of a title entry #1, a title entry #2, a title entry #3, ..., a title entry #n indicating the attributes of the MPEG files. A data length is represented, for example, by the byte.

FIG. 4 is a diagram showing an example of the structure of actual data of a property entry.

Referring to FIG. 4, real data of a property entry is constituted of a type, a property length, a property entry number, a title entry number, a parent entry number and a file identifier.

The type indicates whether the property entry is an upper most level folder, i.e., a root holder, another holder, or a file corresponding to video data (MPEG file). The type is one byte data having the start byte address at a 0-th byte position.

The property data length shows the data length of the property entry in bytes. The property data length is one byte data having the start byte address at a 1-st byte position.

The property entry number starts from #1 and is a unique number assigned to each property entry, i.e., an identifier for identifying each property entry. The property entry number is two-byte data having the start byte address at a 2-nd byte position.

The title entry number indicates a title entry (FIG. 5) corresponding to title information of the property entry. The title entry number is two-byte data having the start byte address at a 4-th byte position.

The parent entry number is a property entry number of a folder to which the property entry belongs. The parent entry number is two-byte data having the start byte address at a 6-th byte position. The parent entry number of the root holder is #0.

The file identifier indicates an MPEG file name if the type of the property entry is a file, and is variable length data having the start byte address at an 8-th byte position. Real data of the title entry contains character trains, character codes and the like.

Next, description will be made on a specific example of a virtual holder structure of the property file 202 and title file 203 which are index files.

It is assumed that the disk media 115 records the four MPEG files managed on the file system as shown in FIG. 2.

Figure 6:
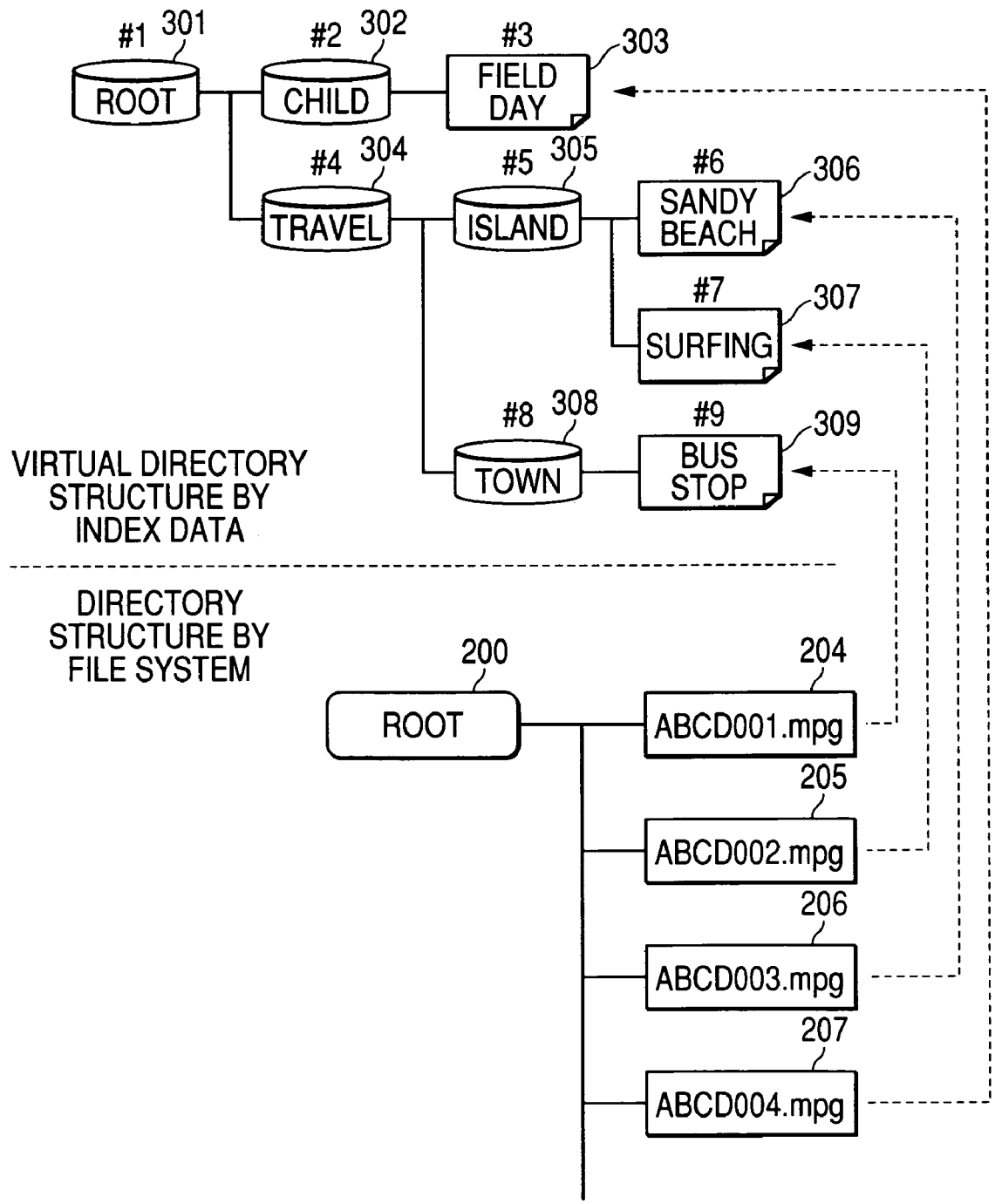
FIG. 6 is a diagram showing a correspondence between a virtual file structure of index data and a directory structure of a file system.

It is also assumed that the MPEG files are classified by the virtual folder structure and title names 301 to 309 shown in FIG. 6. Reference numerals 301, 302, 304, 305 and 308 represent virtual folders, and reference numerals 303, 306, 307 and 309 represent virtual files.

Namely, the ABCD0001.mpg file 204 corresponds to a file 309 having a title name "bus stop", and is stored in a folder 308 having a title name "town" under a folder 304 having a title name "travel".

The ABCD0002.mpg file 205 corresponds to a file 307 having a title name "surfing", and is stored in a folder 305 having a title name "island" under the folder 304 having the title name "travel".

The ABCD0003.mpg file 206 corresponds to a file 306 having a title name "sandy beach", and is stored in the folder 305 having the title name "island" under the folder 304 having the title name "travel".

The ABCD0004.mpg file 207 corresponds to a file 303 having a title name "field day", and is stored in a folder 302 having a title name "child".

FIG. 7 is a diagram showing property entries of the property file 202 when the MPEG files are classified by the virtual folder structure and title names shown in FIG. 6.

FIG. 8 is a diagram showing title entries of the title file 203 when the MPEG files are classified by the virtual folder structure and title names shown in FIG. 6.

In FIG. 7, the property entry number #1 is a root holder having no title entry, a parent entry 0, and no file identifier. The property entry number #2 is a folder having the title name "child", a title entry number #1 as seen from FIG. 8, a parent entry number #1 because it belongs to the root holder, and no file identifier.

The property entry number #3 is a file having the title name "field day", a title entry number #2 as seen from FIG. 8, a parent entry number #2 because it belongs to the "child" folder, and a file identifier "ABCD0004.mpg". The property entry number #4 is a folder having the title name "travel", a title entry number #3 as seen from FIG. 8, the parent entry number #1 because it belongs to the root folder, and no file identifier.

The property entry number #5 is a folder having the title name "island", a title entry number #4 as seen from FIG. 8, a parent entry number #4 because it belongs to the "travel" folder, and no file identifier.

The property entry number #6 is a file having the title name "sandy beach", a title entry number #5 as seen from FIG. 8, a parent entry number #5 because it belongs to the "island" folder, and a file identifier "ABCD0003.mpg". The property entry number #7 is a file having the title name "surfing", a title entry number #6 as seen from FIG. 8, the parent entry number #5 because it belongs to the "island" folder, and a file identifier "ABCD0002.mpg".

The property entry number #8 is a folder having the title name "town", a title entry number #7 as seen from FIG. 8, the parent entry number #4 because it belongs to the "travel" folder, and no file identifier. The property entry number #9 is a file having the title name "bus stop", a title entry number #8 as seen from FIG. 8, a parent entry number #8 because it belongs to the "town" folder, and a file identifier "ABCD0001.mpg".

The control microcomputer 112 analyzes these index files, i.e., the property film 202 and title file 203, and displays the virtual folder structure and title names 301 to 309 on the display 116.

FIG. 9 is a diagram showing an example of a volume structure and a file structure of UDF configured on the disk media 115.

In order to handle the disk media 115 as a logical volume, the storage area of the disk media 115 is divided into units called sectors, and logical sector numbers (hereinafter called LSN) from #0 to the last LSN are assigned to sectors. A length of a logical sector is 2048 bytes equal to a length of a physical sector of the disk media 115. A logical sector number #0 is assigned to a sector having a physical sector number 031000h where h denotes a hexadecimal number.

A physical sector number (hereinafter called PSN) is the sector number assigned to each sector of the disk media 115, and is recorded in a header field of each sector data. By using this sector number, data is read from the disk media.

Referring to FIG. 9, a start volume descriptor pointer is recorded at the same LSN of all DVD disks. In order to improve reliability, the start volume descriptor pointer is recorded at two positions, LSN=256 and the last LSN. The start volume descriptor pointer records head LSNs and the number of data bytes of each of a main volume descriptor train and a reserved volume descriptor train. In order to improve reliability, the same data is recorded in both the main volume descriptor train and reserved volume descriptor train.

A partition descriptor and a logical volume descriptor are recorded in the main volume descriptor train or reserved volume descriptor train. A head LSN of the partition start sector is recorded in the partition descriptor. A start logical block number (LBN) and the number of data bytes of a file set descriptor train are recorded in the logical volume descriptor train. LBN is a serial number starting from #0 at the partition head position. A sector position in each partition is represented by LBN. Therefore, the relation between LSN and LBN is expressed by:

$$LSN=\text{partition head } LSN+LBN.$$

By using this relation, the disk controller 114 converts LBN into LSN, and LSN into PSN to thereby determine the physical sector position of the disk media 115 to be accessed. Data is read from the determined position.

In FIG. 9, a spatial bit map descriptor is recorded at LBN=0 to 79. The spatial bit map descriptor has a spatial bit map indicating whether each logical block can be allocated. Each bit of the spatial bit map corresponds to each logical block. If the bit value is "1", the logical block is still not allocated, whereas if the bit value is "0", the logical block is already allocated.

A file set descriptor is recorded at LBN=80. The file set descriptor records block position information of a file entry of a root directory. A terminator descriptor is recorded at LBN=81. The file entry of the root directory is recorded at LBN=82. The file entry is used in order to store various attribute information unique to each file and information on a time stamp, a file record position (LBN) and a file size.

In FIG. 9, a file entry of the ABCD0001.mpg file is recorded at LBN=100, and its actual data is recorded at LBN=101 to 150. A file entry of the ABCD0002.mpg file is recorded at LBN=151, and its actual data is recorded at LBN=152 to 300. A file entry of the ABCD0003.mpg file is recorded at LBN=301, and its actual data is recorded at LBN=302 to 600. A file entry of the ABCD0004.mpg file is recorded at LBN=601, and its actual data is recorded at LBN=602 to 900.

LBN 901 to the last LBN are still not allocated and recorded, and data is not recorded. Therefore, the corresponding bit value of the spatial bit map descriptor is "1" indicating an unallocated state.

As described above, the UDF file system can know all the directory structures and file structures of the disk media 115 along a route starting from the file entry of each root directory.

In the embodiment, as PC 130 is connected to the video camera 100, prior to a data read request from the file system 140 of PC 130, the control microcomputer 112 controls the memory controller 106 to form a virtual logical block space on the memory 107 and store virtual directory information representative of the directory structures of the disk media 115.

Similar to the logical block space of the disk media 115, the virtual logical block space has one block capacity of 2048 bytes and a virtual LBN (hereinafter called VLBN) is assigned to each block.

The same LBN (VLBN=82) as that of the logical block of the disk media 115 is assigned to the file entry of the root directory. By referring to the property entries (FIG. 7) and title entries (FIG. 8) of the index files, the control microcomputer 112 generates virtual directory information for management by replacing the virtual folder structure and title names based on the index files shown in FIG. 6 with the file structure and file names of UDF. FIG. 10 is a diagram showing the virtual directory information generated in this way.

VLBN of logical blocks excepting the file entry of the root directory is assigned LBN (LBN=901 to the last LBN) in the unallocated state in the spatial bit map on the disk 115.

VLBN=901 is a block of the root directory and is constituted of a plurality of file identifier descriptors. Main information contained in the file identifier descriptor is the file name and position information of the file entry. In this embodiment, the title name of a corresponding property entry is used as the file name, and the position information of the file entry is designated by VLBN. However, if the file identifier descriptor corresponds not to the directory but to the file, the file name is the title name of the corresponding property entry, added with a file identifier extension of the property entry. The position information of the file entry designates LBN of the file entry of the disk media 115.

It can be seen from FIG. 7 that the property entries having the root folder as a parent entry are #2 and #4 which are both not the file but the folder and that the corresponding title entry numbers are #1 and #3. It can be seen from FIG. 8 that there are a folder having the title name "child" and a folder having the title name "travel", under the root folder. Therefore, the block of the root directory at VLBN=901 records: a file identifier descriptor (file entry VLBN=82) of the parent directory (in this embodiment, root directory) of the root directory; a file identifier descriptor (file entry VLBN=902) of the directory name "child"; and a file identifier descriptor (file entry VLBN=904) of the directory name "travel". The directory name is the virtual folder name (the title name of the virtual holder).

VLBN=902 corresponds to the block of the file entry of the "child" directory, and this block records the block position (VLBN=903) of the "child" directory. It can be seen from FIGS. 7 and 8 that the property entry number #3 corresponds to a file under the "child" directory corresponding to the property entry number #2. Its entity is the file having the file name "ABCD004.mpg" and the title name "field day". VLBN=903 corresponds to the block of the "child" directory, and this block records the file identifier descriptor (file entry VLBN=82) of the parent directory (root directory) of the "child" directory, and the file identifier descriptor (file entry VLBN=601) having a file name "field day.mpg" obtained by adding an entity file extension ".mpg" to the title name "field day".

Since the file entry of the entity file ABCD0004.mpg" is allocated to LBN=601 of the disk media 115 (refer to FIG. 9), the file entry of the "field day.mpg" is VLBN=601.

VLBN=904 corresponds to the block of the file entry of the "travel" directory, and this block records the block position (VLBN=905) of the "travel" directory.

VLBN=905 corresponds to the block of the "travel" directory, and as seen from FIGS. 7 and 8 this block records the file identifier descriptor (file entry VLBN=82) of the parent directory (root directory) of the "travel" directory, the file identifier descriptor (file entry VLBN=906) of the "island" directory and the file identifier descriptor (file entry VLBN=908) of the "town" directory.

VLBN=906 corresponds to the block of the file entry of the "island" directory, and this block records the block position (VLBN=907) of the "island" directory.

VLBN=907 corresponds to the block of the "island" directory, and as seen from FIGS. 7 and 8 this block records the file identifier descriptor (file entry VLBN=904) of the parent directory ("travel" directory) of the "island" directory, the file identifier descriptor (file entry VLBN=301) of the "sandy beach" file and the file identifier descriptor (file entry VLBN=151) of a "surfing.mpg" file.

VLBN=908 corresponds to the block of the file entry of the "town" directory, and this block records the block position (VLBN=909) of the "town" directory.

VLBN=909 corresponds to the block of the "town" directory, and as seen from FIGS. 7 and 8 this block records the file identifier descriptor (file entry VLBN=904) of the parent directory ("travel" directory) of the "town" directory and the file identifier descriptor (file entry VLBN=100) of a "bus stop.mpg" file.

Next, with reference to the flow chart shown in FIG. 11, description will be made on the operation of the control microcomputer 112 to be executed upon a read request of data in the disk media 115 from the file system 140 of PC 130 after the virtual directory information is generated in the manner described above.

When a read request of data recorded in a logical block of LBN=X (X=0–the last LBN: X is an integer) of the disk media 115 is received from the file system 140 via the external I/F 118 (Step S1101), the control microcomputer 112 judges whether the virtual disk information in the memory 107 contains the virtual logical block at VLBN=X (Step S1102). If the block at VLBN=X is contained, the flow advances to Step S1103 whereat data of the virtual logical block at VLBN=X is read from the memory 107 and then the flow advances to Step S1105. If the virtual logical block at VLBN=X is not contained, the disk controller 114 is instructed to read data of the logical block at LBN=X of the disk media 115 and then flow advances to Step S1105 (Step S1104).

At Step S1105, data read at Step S1103 or S1104 is transmitted (transferred) to the file system 140 of PC 130. Thereafter, the flow returns to Step S1101 to wait for a read request from the file system 140.

For example, upon reception of a read request of LBN=82 from the file system 140, the control microcomputer 112 sends the data at VLBN=82, i.e., the data of the file entry of the root directory, to the file system 140. The file system 140 can know from this data that the logical block number (actually, the virtual logical block number) at which the file entry of the root directory is stored, is 901. The file system 140 requests transmission of the data at LBN=901.

By repeating these operations, the virtual directory information shown in FIG. 10 is transmitted in response to the transmission request from the file system of PC 130.

Figure 12:
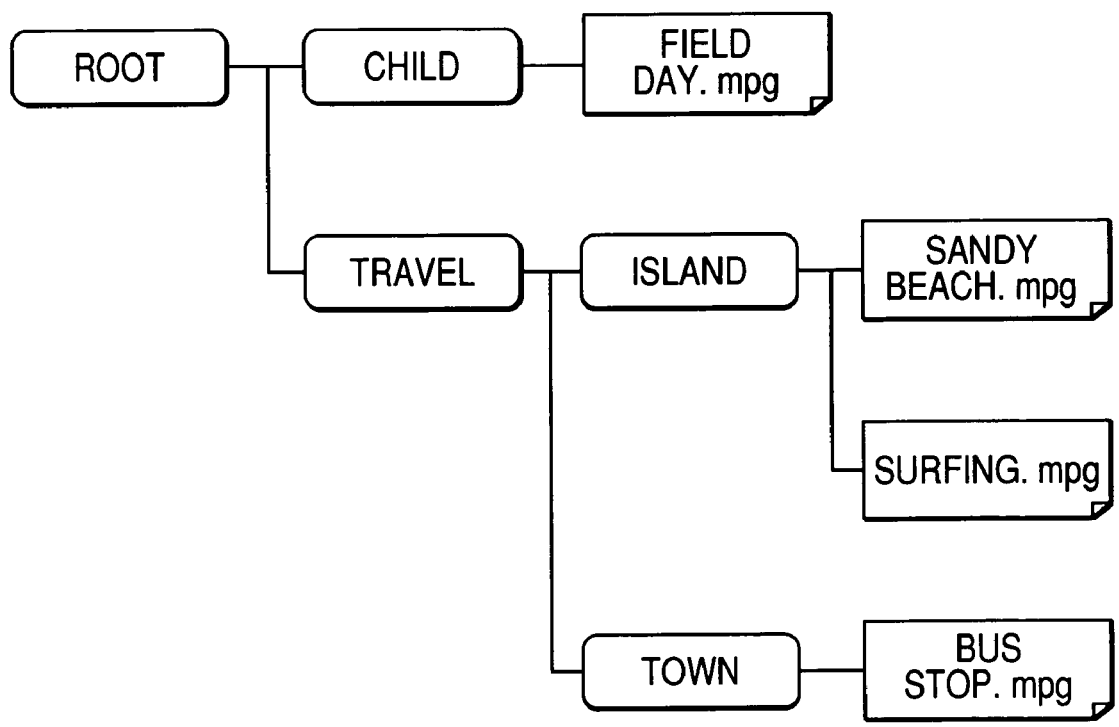
FIG. 12 is a diagram showing an example of the structure of a file transferred to a file system of PC.

Therefore, when the MPEG files 204 to 207 of the disk media 115 having the virtual folder structure and title names shown in FIG. 6 are to be transferred to PC 130, the virtual folder structure and title names shown in FIG. 6 are replaced with the file structure and file names in conformity with UDF as shown in FIG. 12.

Therefore, even if there is no dedicated application for recognizing the virtual directory structure shown in FIG. 6, the file structure and file names similar to the virtual folder structure and title names shown in FIG. 6 can be displayed on PC 130.

The file name has the title name added with an extension (.mpg) of video data. Namely, the file name is changed to a name obtained by adding the extension of MPEG data to the title name of each MPEG file, and this changed name is transmitted to the file system 140.

As described above, according to the embodiment, upon reception of a transmission request of data in the disk media from PC 130, virtual directory information on the directory structure, directory names and file names corresponding to the virtual folder structure, virtual folder names and file names on the disk media 115, is generated. Upon reception of a read request of data on the disk media 115 from PC 130, the virtual directory information is read and transmitted to PC 130.

The virtual directory information contains the data of a block in which the file entry of the root directory of the disk media 115, and the numbers of blocks in an unallocated state in the disk media 115 are assigned as the virtual logical block numbers, excepting the block in which the file entry of the root directory is recorded.

All directories and file entries under the root directory are described in the virtual directory information. The file entries of information data files and actual MPEG file data are not described in the virtual directory information. The file identifier descriptor representative of a MPEG file indicates the head logical block number at which the file entry of the MPEG file in the disk media 115 is recorded.

In this embodiment, although MPEG files are processed by the video camera 100 and PC 130, the present invention is also applicable to other files such as still image files containing JPEG encoded still image data and audio files containing audio data.

As described above, according to the embodiment, when information data files recorded on a recording medium is to be transmitted to an external apparatus, index file information such as the virtual folder structure and title names is replaced with the structure in conformity with the file system of the external apparatus.

Therefore, even if the external apparatus does not have a dedicated application for understanding the structure of index files, the external apparatus can display the file structure and file names similar to the virtual folder structure and title names. It is therefore easy for users to handle information data files recorded on a disk media.

Figure 11:
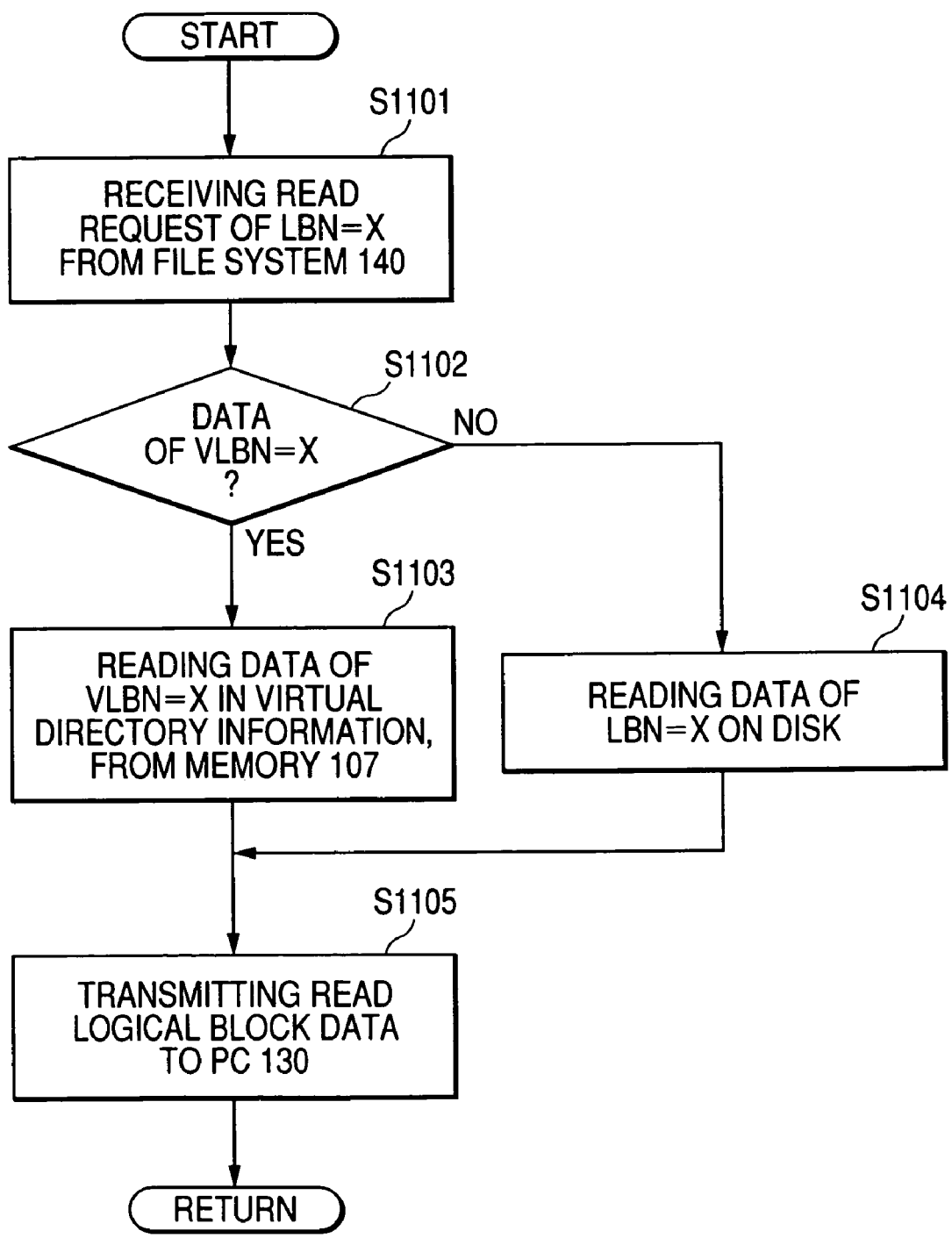
FIG. 11 is a flow chart illustrating a read operation of a logical block to be executed by a control microcomputer.

The embodiment can be realized by making the control microcomputer (computer) 112 execute a program for the processes shown in FIG. 11. Embodiments of the present invention may be applied to means for supplying a computer with the program, e.g., a computer readable storage media such as a CD-ROM storing the program, and a transmission media for transmitting the program such as the Internet. Embodiments of the present invention may also be applied to computer program products storing the program such as a computer readable recording medium. The above-described program, recording medium, transmission media and computer program products are considered to fall within the scope of the present invention. The recording medium may be a flexible disk, a hard disk, an optical disk, a magneto optical disk, a CD-ROM, a magnetic tape, a nonvolatile memory card, a ROM or the like.

The above-described embodiments are only illustrative for embodying the present invention and are not construed to limitatively analyze the technical scope of the present invention. Namely, the present invention can be reduced in practice in various forms without departing from the technical concept or main features of the present invention.

This application claims priority from Japanese Patent Application No. 2004-319524 filed on Nov. 2, 2004, which is hereby incorporated by reference herein.

What is claimed is:

1. A camera communicable with an external apparatus having a storage device that stores a data file in accordance with a predetermined file system of the camera, the camera being configured to pick up an image and store the picked up image in a recording medium as an image file, which includes image data, and an index file for managing the image file classified into at least one virtual folder in accordance with the predetermined file system, structure of the virtual folder being different from structure of the predetermined file system, the index file including a folder title of the at least one virtual folder and a file title of the image file stored in the at least one virtual folder, the camera comprising:

a reading device that reads the image file and the index file from the recording medium in accordance with the predetermined file system, wherein the recording medium is divided into a number of logic blocks and the image file stored in the recording medium is managed on a logic block basis by the predetermined file system;

a communication device that transmits the image file read by said reading device through a predetermined transmission path to the external apparatus; and a controller that generates virtual directory information having structure corresponding to the structure of the predetermined file system and indicating directory structure of the recording medium on the basis of the index file, wherein the generated virtual directory information includes a virtual directory corresponding to the at least one virtual folder, a name of the virtual directory corresponding to the folder title of the at least one virtual folder included in the index file, and a file name of the image file corresponding to the file title of the image file stored in the at least one virtual folder included in the index file, wherein the virtual directory information is constituted of a plurality of virtual logic blocks each storing information on the virtual directory, the name of the virtual directory, and the file name, wherein the generated virtual directory information also contains information on a root directory of the recording medium, and a value of a virtual logic block among the virtual logic blocks in which the information of the root directory is stored is same as a value of the logic block among the logic blocks of the recording medium in which the information on the root directory is stored, wherein said controller controls said communication device to transmit the generated virtual directory information in response to a data transmission request from said external apparatus and wherein said controller controls said communication device to transmit to said external apparatus information on a virtual logic block, among the virtual logic blocks, having a value corresponding to a logic block requested by said external apparatus, among the plurality of logic blocks of the recording medium.

2. The camera according to claim 1, further including an image pickup unit that photographs and generates the image data.

3. A reproducing method for a camera communicable with an external apparatus having a storage device that stores a data file in accordance with a predetermined file system of the camera, the camera being configured to pick up an image and store the image in a recording medium as an image file, which includes image data, and an index file for managing the image file classified into at least one virtual folder in accordance with the predetermined file system, structure of the virtual folder being different from structure of the predetermined file system, the index file including a folder title of the at least one virtual folder and a file title of the image file stored in the at least one virtual folder, the method comprising the steps of:

reading the image file and the index file from the recording medium in accordance with the predetermined file system, wherein the recording medium is divided into a number of logic blocks and the image file stored in the recording medium is managed on a logic block basis by the predetermined file system;

transmitting the image file read by the reading step through a predetermined transmission path to the external apparatus;

generating virtual directory information having structure corresponding to the structure of the predetermined file system and indicating directory structure of the recording medium on the basis of the index file, wherein the generated virtual directory information includes a virtual directory corresponding to the at least one virtual folder, a name of the virtual directory corresponding to the folder title of the at least one virtual folder included in the index file, and a file name of the image file corresponding to the file title of the image file stored in the at least one virtual folder included in the index file, wherein the virtual directory information is constituted of a plurality of virtual logic blocks each storing information on the virtual directory, the name of the virtual directory, and the file name, and wherein the generated virtual directory information also contains information on a root directory of the recording medium, and a value of a virtual logic block among the virtual logic blocks in which the information of the root directory is stored is same as a value of the logic block among the logic blocks of the recording medium in which the information on the root directory is stored;

controlling the transmitting step to transmit the generated virtual directory information in response to a data transmission request from said external apparatus; and controlling the transmitting step to transmit to said external apparatus information on a virtual logic block, among the virtual logic blocks, having a value corresponding to a logic block requested by said external apparatus, among the plurality of logic blocks of the recording medium.

4. The method according to claim 3, wherein the camera includes an image pickup unit that photographs and generates the image data.

* * * * *